United States Patent
Zhang et al.

(10) Patent No.: US 7,961,022 B2
(45) Date of Patent: Jun. 14, 2011

(54) PULSED WIDTH MODULATED CONTROL METHOD AND APPARATUS

(75) Inventors: Zhihong Zhang, Shanghai (CN); Xujiang Huang, Shanghai (CN)

(73) Assignee: BCD Semiconductor Manufacturing Limited (KY)

( * ) Notice: Subject to any disclaimer, the term of this patent is extended or adjusted under 35 U.S.C. 154(b) by 31 days.

(21) Appl. No.: 12/500,923

(22) Filed: Jul. 10, 2009

(65) Prior Publication Data

US 2010/0164581 A1    Jul. 1, 2010

(30) Foreign Application Priority Data

Dec. 31, 2008  (CN) ...................... 2008 2 0129235 U

(51) Int. Cl.
*H03K 3/017*  (2006.01)
(52) U.S. Cl. ........................ 327/175; 318/599
(58) Field of Classification Search .......... 327/172–177; 318/471, 599, 634, 671, 783; 388/934
See application file for complete search history.

(56) References Cited

U.S. PATENT DOCUMENTS

| | | | |
|---|---|---|---|
| 6,943,517 B2 * | 9/2005 | Yoshitomi et al. | 318/471 |
| 7,612,521 B2 * | 11/2009 | Miyajima | 318/819 |
| 7,646,162 B2 * | 1/2010 | Ma | 318/599 |
| 2008/0044165 A1 * | 2/2008 | Miyajima | 388/819 |
| 2008/0088268 A1 * | 4/2008 | Sakaguchi | 318/471 |
| 2010/0054964 A1 * | 3/2010 | Teng et al. | 417/326 |
| 2010/0109730 A1 | 5/2010 | Zhang et al. | |

OTHER PUBLICATIONS

U.S. Appl. No. 12/425,366, filed Apr. 16, 2009, Zhang et al.

* cited by examiner

*Primary Examiner* — Lincoln Donovan
*Assistant Examiner* — William Hernandez
(74) *Attorney, Agent, or Firm* — Kilpatrick Townsend & Stockton LLP

(57) ABSTRACT

A pulse width modulated (PWM) controller has an input terminal for receiving a pulsed input signal having a first duty cycle, a power supply terminal for receiving a power supply voltage. a minimum duty cycle reference voltage signal, and a control circuit for providing a pulse-width-modulated (PWM) output signal having a second duty cycle related to the first duty cycle of the pulsed input signal. The PWM output control signal having a minimum duty cycle that is adjustable in response to a change in the power supply voltage. In an embodiment, the second duty cycle and the first duty cycle are correlated in a substantially linear relationship. In an embodiment, the PWM control circuit also has a triangle wave generation circuit for generating a triangle wave signal configured to oscillate between an upper limit voltage and a lower limit voltage, which are adjustable in response to a change in the power supply voltage.

24 Claims, 6 Drawing Sheets

PULSED WIDTH MODULATED CONTROL METHOD AND APPARATUS

CROSS-REFERENCES TO RELATED APPLICATIONS

This application claims priority to Chinese Patent Application No. 200820129235.0, filed Dec. 31, 2008, which is commonly owned and incorporated herein in its entirety by reference for all purposes. This application is also related to U.S. patent application Ser. No. 12/425,366, filed Apr. 16, 2009 and entitled "PWM Control Circuit Having Adjustable Minimum Duty Cycle," which is commonly owned and incorporated herein in its entirety by reference for all purposes.

BACKGROUND OF THE INVENTION

The present invention relates generally to pulse width modulation (PWM) control circuits. More particularly, the invention provides methods and apparatus for a PWM fan motor speed control circuit which accepts a pulsed input signal and provides a PWM output signal having an adjustable minimum duty cycle.

Regulated power sources are indispensable in modern electronics. For example, the power supply in a personal computer often needs to receive power input from various outlets. Desktop and laptop computers often have regulated power supplies on the motherboard to supply power to the CPU, memories, and peripheral circuitry. Regulated power supplies are also used in a wide variety of consumer applications, such as home appliances, automobiles, and portable chargers for mobile electronic devices, etc.

Regulated power sources are also used in other applications including controlling the speed of a DC motor, e.g., for driving a cooling fan in a computer. As modern personal computers become more powerful, they consume more power and generate more heat. As a result, regulator circuits for fan motor speed control have become increasingly prevalent.

Pulse Width Modulation (PWM) control circuits have been widely used in switching mode power supplies. In PWM control circuits, the duty cycle of the control pulse is used to control the output of a device. In various applications, it is often desirable to set a minimum duty cycle of the output pulse, such that the duty cycle of the output pulse of the PWM control circuit does not become smaller than a predetermined value.

In particular, single phase brushless electric motors with adjustable speed have been widely researched and applied in such fields as cooling fans, because they provide advantages such as low energy consumption and low noise. For example, Japanese patent publication HEI3-74199 describes a cooling fan system using a temperature sensitive device to convert a temperature measurement to a voltage signal. The voltage signal is compared to a triangle wave to produce pulse width modulated control signals, with a larger duty cycle at high temperatures and a smaller duty cycle at lower temperatures.

U.S. Pat. No. 6,943,517 disclosed a method of using a temperature-sensing device, such as a thermistor, to convert a temperature signal to a voltage signal which is compared with a triangle wave to produce pulse width modulated signal for motor speed control. In addition, U.S. Pat. No. 6,943,517 included minimum duty cycle setting circuit and full speed starting circuit. Motor speed control using a temperature-sensing device is also used in products such as LB11961 from SANYO and TC642 from Microchip.

Even though widely used, conventional techniques for adjusting the speed of single-phase motors have many limitations, such as:

1. In some cases, the control signal for motor speed control is an analog signal provided by a temperature sensing device, and can not be easily adapted for pulsed signal control of motor speed. The pulsed signals may or may not carry temperature related information.
2. Some conventional controllers include a fixed minimum duty cycle setting. In this design, the power consumption tends to be high at high power supply voltages, but may not allow adequate starting power at low power supply voltages.
3. Some conventional controllers accept pulsed control input signal to control the speed of single-phase motors. However, these controllers do not provide a minimum duty cycle. These controllers can not satisfy the requirements of some applications in which a non-zero motor speed is desired when the duty cycle of the input pulsed signal is zero.

From the above, it is seen that improved PWM control circuits and methods are desired.

BRIEF SUMMARY OF THE INVENTION

Embodiments of the present invention provide methods and apparatus for a pulse-width-modulated (PWM) controller that accepts a pulsed input signal and provides an output PWM control signal which has an adjustable minimum duty cycle. In some embodiments, the duty cycle of the output PWM control signal has a duty cycle correlated to the duty cycle of the pulsed input signal. The input pulsed signal is first converted to an analog signal which has a magnitude correlated to the duty cycle of the pulsed input signal. The PWM output control signals are generated based on a comparison of the analog signal with a triangle wave signal. In these embodiments, the triangle wave signal is adjustable in response to a change of the power supply voltage. In some embodiments, the triangle wave signal is raised when the power supply is below a certain reference voltage, such that the duty cycle is increased under low voltage conditions. In certain embodiments, a minimum duty cycle setting voltage is used to determine a minimum duty cycle. With the adjustable triangle wave signal, the minimum duty cycle is also raised under low voltage conditions. In other embodiments, a PWM motor controller having such an adjustable minimum duty cycle and a motor system are also provided.

According to an embodiment of the present invention, a pulse width modulated (PWM) controller includes an input terminal for receiving a pulsed input signal having a first duty cycle, a power supply terminal for receiving a power supply voltage, and a minimum duty cycle reference voltage signal generation circuit for providing a minimum duty cycle reference voltage signal. The PWM control circuit also has a control circuit for providing a pulse-width-modulated (PWM) output signal having a second duty cycle, which is linearly related to the first duty cycle of the pulsed input signal. The PWM output control signal also has a minimum duty cycle that is adjustable in response to a change in the power supply voltage.

In an embodiment of the above controller, the second duty cycle and the first duty cycle are correlated in a substantially linear relationship with an adjustable slope. and the slope between the output signal and the input pulsed signal can be adjusted.

In another embodiment, PWM controller also includes a signal conversion circuit for converting the pulsed input signal to an analog signal having a magnitude inversely correlated to the first duty cycle of the pulsed input signal, and a triangle wave generation circuit for generating a triangle wave signal configured to oscillate between an upper limit voltage and a lower limit voltage. The upper limit voltage and the lower limit voltage being adjustable in response to a change in the power supply voltage. The controller also has a pulse generation circuit coupled to the signal conversion circuit, the triangle wave generation circuit, and the minimum duty cycle reference voltage signal. The pulse generation circuit is configured to generate the PWM pulse signal having a minimum duty cycle related to the triangle wave signal and the minimum duty cycle reference voltage signal. In another embodiment, the upper limit voltage and the lower limit voltage of the triangle wave signal are raised when the power supply voltage is lower than a predetermined supply reference voltage.

In another embodiment, the PWM output signal is characterized by a first minimum duty cycle when the power supply voltage is above a supply reference voltage, and by a second minimum duty cycle when the power supply voltage is below the supply reference voltage. The second minimum duty cycle is higher than the first minimum duty cycle.

In another embodiment, the signal conversion circuit includes first, second, and third pairs of serially-connected resistors. Each pair of resistors is coupled between the power supply terminal and a ground terminal. The first pair includes first and second resistors, the second pair includes third and fourth resistors, and the third pair includes fifth and sixth resistors. The signal conversion circuit also includes an input terminal coupled to the first pair of resistors, a first transistor coupled between the first and the second pairs of resistors, and a second transistor coupled between the second and the third pair of resistors. Moreover, the signal conversion circuit also has a capacitor coupled to the third pair of resistors, and an output terminal coupled to the capacitor. In another embodiment, the fourth resistor is substantially larger than the third resistor, and the fifth resistor is substantially larger than the sixth resistor. In another embodiment, an output signal at the output terminal of the signal conversion circuit is inversely related to a duty cycle of an input signal at the input terminal.

In another embodiment of the above PWM controller, the triangle wave generation circuit includes a capacitor having an output terminal for providing the triangle wave signal, a first current source coupled to the capacitor for charging the capacitor and a second current source coupled to the capacitor for discharging the capacitor. A variable reference voltage source is configured to provide the upper limit voltage when the capacitor is being charged and the lower limit voltage when the capacitor is being discharged. The variable reference voltage source is further configured to receive a bias current for raising the upper limit voltage and the lower limit voltage when the power supply voltage is lower than the supply reference voltage. The triangle wave generation circuit also includes a first comparator having a first input coupled to the capacitor and a second input coupled to the variable reference voltage source.

In another embodiment of the above PWM controller, the variable reference voltage source includes a voltage divider having first resistor, second resistor, and third resistor connected in series between the power supply terminal and a ground terminal. A first node between the first and the second resistors is adapted for providing the upper limit voltage and the lower limit voltage of the triangle wave signal. The first node is also adapted for receiving the bias current that is configured to raise the upper limit voltage and the lower limit voltage. The variable reference voltage source also has a second switch transistor coupled to the first comparator and to a second node between the second and the third resistors. The second switch transistor is configured to couple the second node to the ground terminal in response to the output of the comparator.

According to another embodiment of the invention, a motor control circuit includes a signal conversion circuit for converting a pulsed input signal having a first duty cycle to an analog signal having a magnitude inversely correlated to the first duty cycle of the pulsed input signal, and a triangle wave generation circuit for generating a triangle wave signal configured to oscillate between an upper limit voltage and a lower limit voltage. The upper limit voltage and the lower limit voltage are adjustable in response to a change in the power supply voltage. The motor control circuit also has a pulse generation circuit coupled to the signal conversion circuit, the triangle wave generation circuit, and the a minimum duty cycle reference voltage signal, the pulse generation circuit being configured to provide a PWM pulse signal having a second duty cycle correlated to the first duty cycle of the pulsed input signal. The PWM pulse signal has a minimum duty cycle related to the triangle wave signal and a minimum duty cycle reference voltage signal. Moreover, the motor control circuit also has a Hall signal processing circuit, a logic circuit coupled to the pulse generation circuit and the Hall signal processing unit and configured to provide motor control signals, and a bridge driver circuit coupled to the logic circuit for receiving the motor control signals and configured to control a speed of the motor.

According to an alternative embodiment, a motor system includes a motor and a motor control circuit. The motor control circuit includes a signal conversion circuit for converting a pulsed input signal having a first duty cycle to an analog signal having a magnitude inversely correlated to the first duty cycle of the pulsed input signal, and a triangle wave generation circuit for generating a triangle wave signal configured to oscillate between an upper limit voltage and a lower limit voltage. The upper limit voltage and the lower limit voltage are adjustable in response to a change in the power supply voltage. The motor control circuit also has a pulse generation circuit coupled to the signal conversion circuit, the triangle wave generation circuit, and the a minimum duty cycle reference voltage signal, the pulse generation circuit being configured to provide a PWM pulse signal having a second duty cycle correlated to the first duty cycle of the pulsed input signal. The PWM pulse signal has a minimum duty cycle related to the triangle wave signal and a minimum duty cycle reference voltage signal. Moreover, the motor control circuit also has a Hall signal processing circuit, a logic circuit coupled to the pulse generation circuit and the Hall signal processing unit and configured to provide motor control signals, and a bridge driver circuit coupled to the logic circuit for receiving the motor control signals and configured to control a speed of the motor.

A further understanding of the nature and advantages of the present invention may be realized by reference to the remaining portions of the specification and the drawings.

DETAILED DESCRIPTION OF THE INVENTION

Embodiments of the present invention provide methods and apparatus for a pulse-width-modulated (PWM) controller that accepts a pulsed input signal and provides an output PWM control signal which has an adjustable minimum duty cycle.

In some embodiments of the present invention, a PWM fan speed control system can provide one or more of the following functions: (1) accept pulsed input signal and then output PWM signal to control fan speed; (2) the duty cycle of the output PWM control signal has a duty cycle correlated to the duty cycle of the pulsed input signal and the slope between output signal and input signal can be adjusted; and (3) the output PWM signal has a adjustable minimum duty cycle to prevent the system output from falling below a certain minimum output level and allow the system to start at a low supply voltage, regardless of the status of input pulsed signal.

In PWM control systems, a minimum duty cycle is often provided for setting a minimum output level. For example, a cooling fan in a computer system usually rotates at a fast speed when the temperature is high, and more slowly when the temperature is low. No matter how low the temperature is, however, it may be desirable that the fan operate at a certain minimum speed upon being turned on to ensure the safety of the cooling object. The PWM circuits having a fixed minimum duty cycle setting, however, often cannot achieve the purpose under certain conditions. e.g., when the power supply is too low. In other motor speed control applications, a small duty cycle can operate the motor when the supply voltage is high. However, a large duty cycle may be required to maintain motor operation when the supply voltage is low. Therefore, PWM circuits having an adjustable duty cycle setting and adjustable minimum duty cycle setting are desirable.

Figure 1:
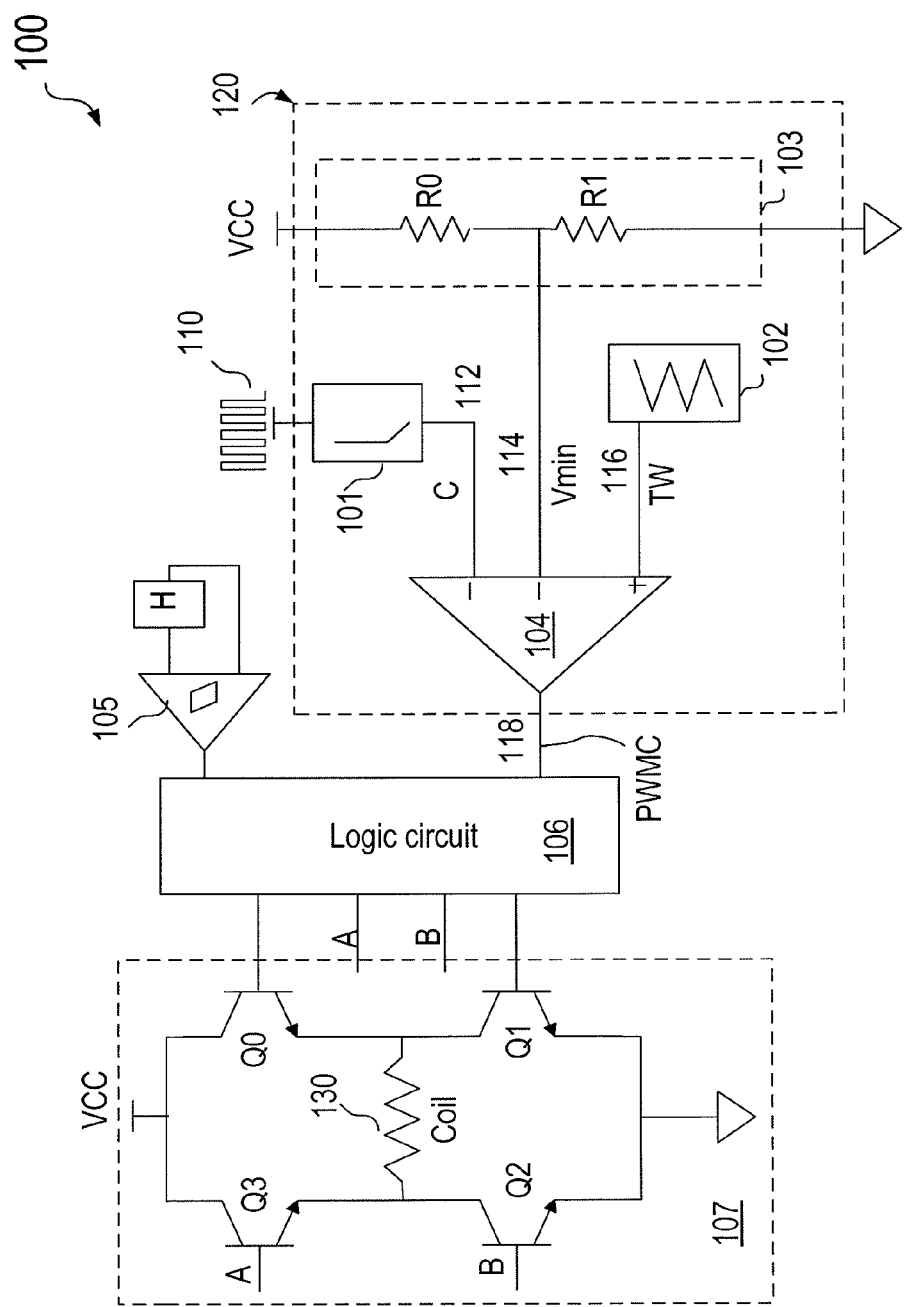
FIG. 1 is a simplified block diagram illustrating a motor system including a PWM control circuit according to an embodiment of the present invention.

FIG. 1 is a simplified block diagram illustrating a motor system 100 according to an embodiment of the present invention. Motor system 100 includes a coil 130 representing a motor and a motor control circuit that has a pulse-width-modulated (PWM) control circuit 120, a Hall signal processing circuit 105, a logic control circuit 106, and a bridge driver circuit 107.

In an embodiment, PWM control circuit 120 is configured to receive a pulsed input signal 110, e.g., a first PWM signal, and outputs a second PWM control signal 118 (PWMC) that has a minimum duty cycle setting. In an embodiment, PWM control signal 118 also has an adjustable duty cycle. As shown in FIG. 1, PWM control signal 118 is fed to logic circuit 106 to control the speed of the motor by controlling the magnitude of the average current in motor coil 130. In an embodiment, the second PWM control signal 118 has a duty cycle that is linearly correlated to the duty cycle of pulsed input signal 110. In such case, the motor speed will be substantially linearly correlated to the duty cycle of pulsed input signal 110.

In an embodiment, the slope between second PWM control signal and the pulsed input signal can be adjusted.

As shown in FIG. 1, Hall signal processing circuit 105 includes one or more Hall effect sensors and is configured to produce a signal for controlling a current direction in coil 130 in the motor when a rotor passes through a cross-point between its north pole and south pole. The output signal from the Hall signal processor is coupled to logic control circuit 106, which is configured to select current paths in the bridge driver circuit and control a current direction through the coil in response to the control signals from Hall signal processing circuit 105.

As shown in FIG. 1, PWM control circuit 120 includes a signal conversion circuit 101, a minimum duty cycle voltage generation circuit 103, a triangle wave (or saw-tooth wave) generation circuit 102 whose output is designated TW, and a pulse generation circuit 104. Signal conversion circuit 101 is configured to convert the input pulse signal 110 to an analog signal 112 (also labeled as "C" in FIG. 1). Minimum duty cycle voltage generation circuit 103 provides a reference voltage 114 that is used for setting a minimum duty cycle, Dmin, of the PWM control signal 118. In this arrangement, the duty cycle of PWM control signal 118 will not be less than Dmin regardless of the duty cycle of the input PWM control signal 110.

Figure 2:
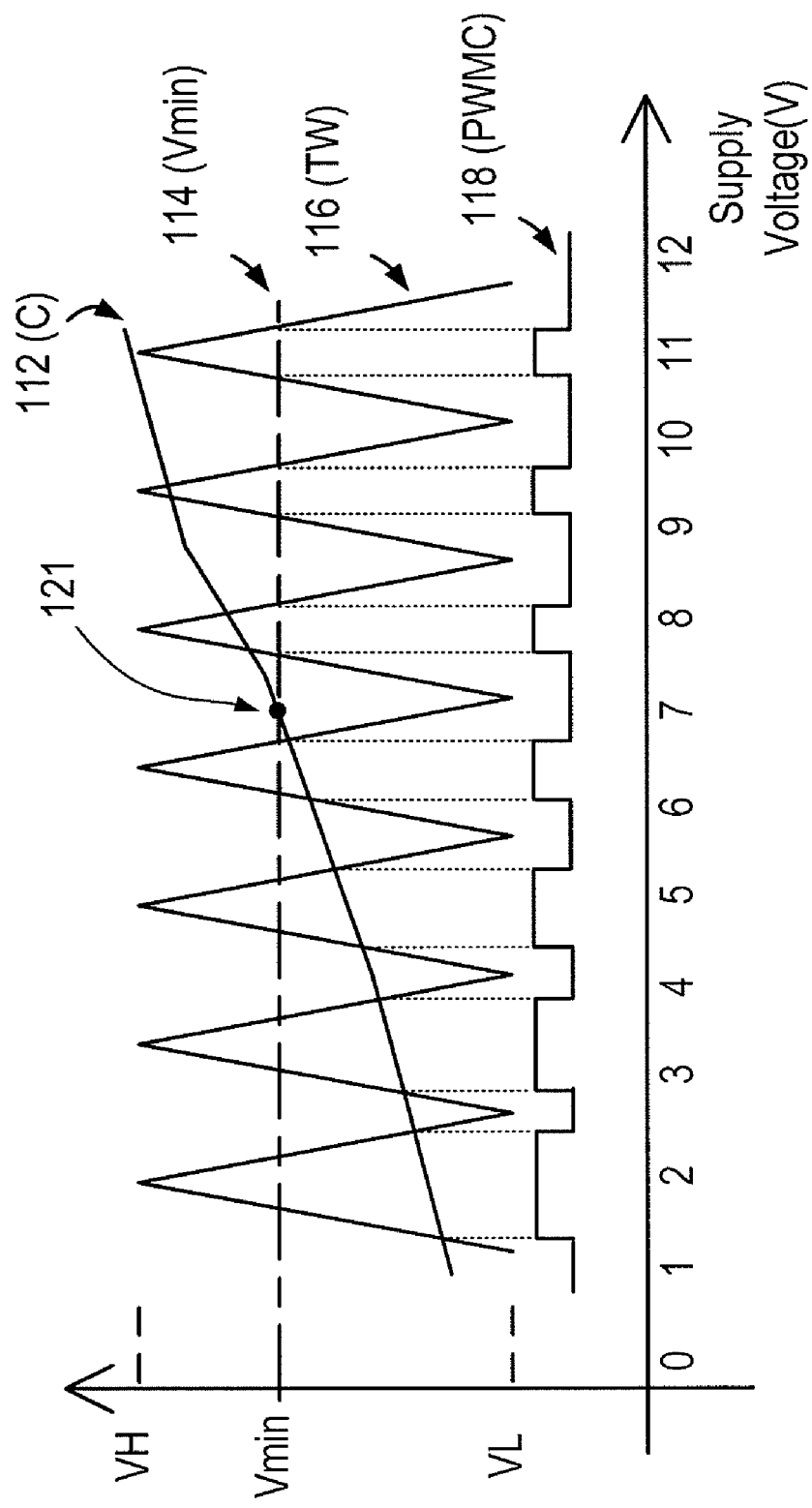
FIG. 2 is a simplified diagram illustrating operation of the PWM control circuit of FIG. 1 according to an embodiment of the present invention.

In a specific embodiment, pulse generation circuit 104 is a comparator circuit having three input terminals. The two negative terminals (−) are configured for receiving the analog output C of signal conversion circuit 101 and the output Vmin of the minimum duty cycle reference voltage 114, respectively. The positive terminal is configured for receiving the output TW of triangle wave generator 116. In an embodiment, comparator circuit 104 is configured for providing a PWM signal having a minimum duty cycle feature as illustrated in FIG. 2, in which the various signals in FIG. 1 are shown using the same reference numerals. As shown, triangle wave signal 112 (TW) oscillates between an upper limit voltage VH and a lower limit voltage limit VL. The duty cycle of PWM output signal 118 is determined by comparing triangle wave signal 116 with a reference voltage. In FIG. 2, the PWM output signal is high when triangle wave signal is higher than the reference voltage, and PWM output signal is low when the triangle wave signal is lower than the reference voltage. In FIG. 2, the reference voltage is the lower one of input analog control signal 112 and minimum duty cycle setting voltage 114 (Vmin), which intersect each other at crossover point 121. To the left of crossover point 121, when input control signal 112 is lower than triangle wave signal 116, as shown in FIG. 2, the duty cycle of PWM output signal 118 is controlled by input control signal 112. When input control signal 112 is higher than minimum duty cycle setting voltage 114, as shown in FIG. 2 to the right of crossover point 121, the minimum duty cycle feature is in activated, and the duty cycle of PWM output signal 118 is controlled by minimum duty cycle setting voltage 114, Vmin, and independent of control signal 112.

As shown in FIG. 1, minimum duty cycle setting voltage, Vmin, is provided by a voltage divider coupled from Vcc. As a result, Dmin may decrease at low Vcc. In some applications, it may be desirable increase Dmin when the power supply voltage is low. An example is described below.

Figure 3:
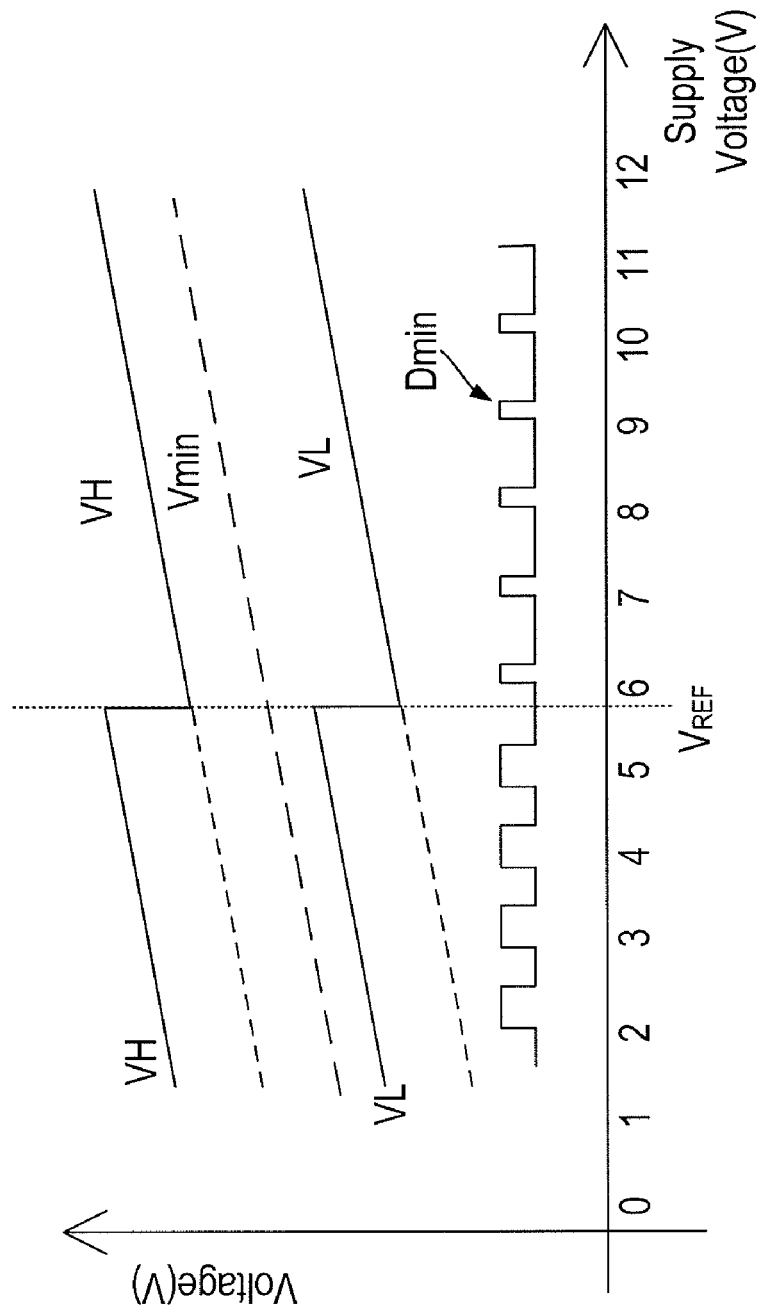
FIG. 3 is a simplified diagram illustrating an additional feature of adjustable minimum duty cycle of the PWM control circuit in FIG. 1 according to an embodiment of the present invention.

FIG. 3 is a simplified diagram illustrating the concept of a variable minimum duty cycle according to an embodiment of the present invention. As shown, upper limit voltage VH and lower limit voltage VL of the triangle wave signal, as well as minimum duty cycle setting voltage Vmin are dependent on the power supply voltage, similar to their parts in FIG. 2. In this embodiment, however, when the power supply voltage is lower than a predetermined reference voltage $V_{REF}$, VH and VL are raised from their respective original values shown in dotted lines. As a result, the minimum duty cycle Dmin is increased when the power supply voltage is lower than $V_{REF}$.

It is noted that, in FIG. 3, VH and VL are adjustable in response to a change in the power supply voltage. As a result, the triangle wave signal is shifted, and the duty cycle of the PWM signal are adjusted, even when the minimum duty cycle condition is not activated. In other words, the duty cycle is higher when the power supply is below a certain reference voltage. This feature can be used advantageously to provide adequate PWM signal at low supply voltages and allow reduced power consumption by providing a lower duty cycle at high supply voltages. An example of triangle wave generation circuit that can provide the function of FIG. 3 is described below in connection with FIG. 6.

According to an embodiment of the present invention, in order to introduce the minimum duty cycle feature to a pulsed signal, such as input pulse signal 110 in FIG. 1, the pulse signal is first converted to an analog signal in signal conversion circuit 101.

Figure 4:
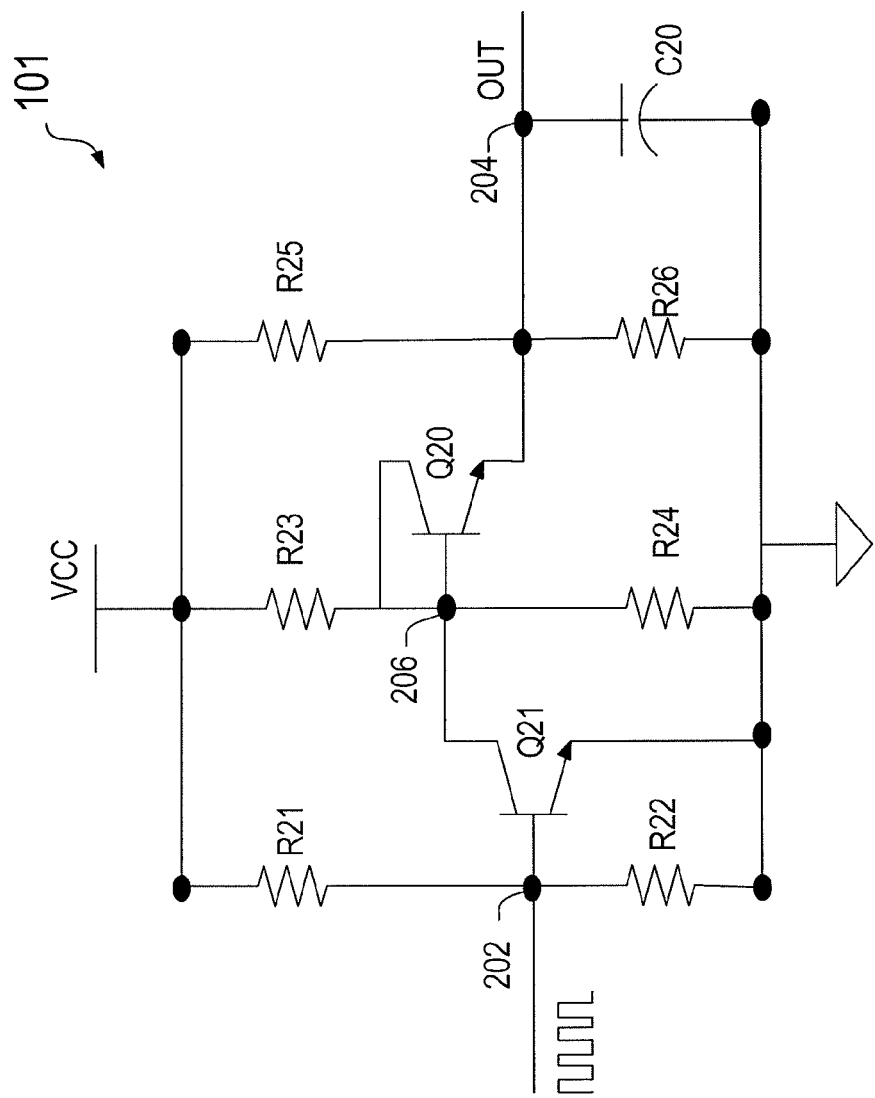
FIG. 4 is a simplified circuit diagram of a signal conversion circuit in FIG. 1 according to an embodiment of the present invention.

FIG. 4 is a simplified circuit diagram of a representative implementation of signal conversion circuit 101 of FIG. 1 according to an embodiment of the present invention. Signal conversion circuit 101 is configured to convert a pulsed input signal to an analog signal having a magnitude determined by the duty cycle of the pulsed input signal. This example of signal conversion circuit 101 includes three pairs of resistors, a capacitor C20, and transistors Q20 and Q21. Each of the pairs of resistors R21 and R22, R23 and R24, and R25 and R26 are coupled in series between a power supply terminal VCC and a ground terminal GND. Signal conversion circuit 101 also has an input terminal 202 at a node between resistors R1 and R2, and an output terminal OUT, 204, at a node between resistors R25 and R26. Capacitor C20 has a first terminal coupled to output terminal 204 and a second terminal coupled to ground terminal GND. The base and collector terminals of transistor Q20 are shorted together and coupled to a node 206 between resistors R23 and R24. The emitter terminal of transistor Q20 is coupled to output terminal 204 and to resistors R25 and R26 and capacitor C20. Transistor Q21 has a base terminal coupled to input terminal 202 and to resistors R21 and R22, a collector terminal coupled to node 206 and to resistors R23 and R24, and an emitter terminal coupled to ground terminal GND.

In some embodiments, signal conversion circuit 101 receives a PWM control signal at input terminal 202. The PWM control signal may vary between a high voltage level and a low voltage level with a period p and a duty cycle t, where t is a fraction between 0 and 1, or 0<t<1. That is, input pulse is at the high level during a fraction t of the period and at the low level during 1−t fraction of the period. In FIG. 4, when the input signal is at the low level, transistor Q21 is turned off, and transistor Q20 is turned on, and capacitor C20 is charged through resistors R23 and R24. On the other hand, when the input signal is at the high level, transistor Q21 is turned on, which pulls down the base of transistor Q20, turning off transistor Q20. Under this condition, capacitor C20 is discharged through resistors R25 and R26. In an embodiment, the resistances of resistors R24 and R25 are much larger than those for resistors R3 and R6. For example, in a specific embodiment, R24=80K, R25=91K, R23=40K, and R26=18K.

During a steady state of duty cycle t, the voltage across capacitor C20 can be approximately expressed as:

$$VOUT = VC20 \quad (1)$$
$$= (1-T)*VCC*\left(\frac{R26}{R23}\right)$$

As shown, the analog signal $V_{OUT}$ is linearly correlated to the duty cycle t of the pulsed input signal 110. In this embodiment, $V_{OUT}$ is linearly correlated to t. In some embodiments, capacitor C20 can be an external capacitor. In other embodiments, capacitor C20 can be an on-chip capacitor.

Figure 5:
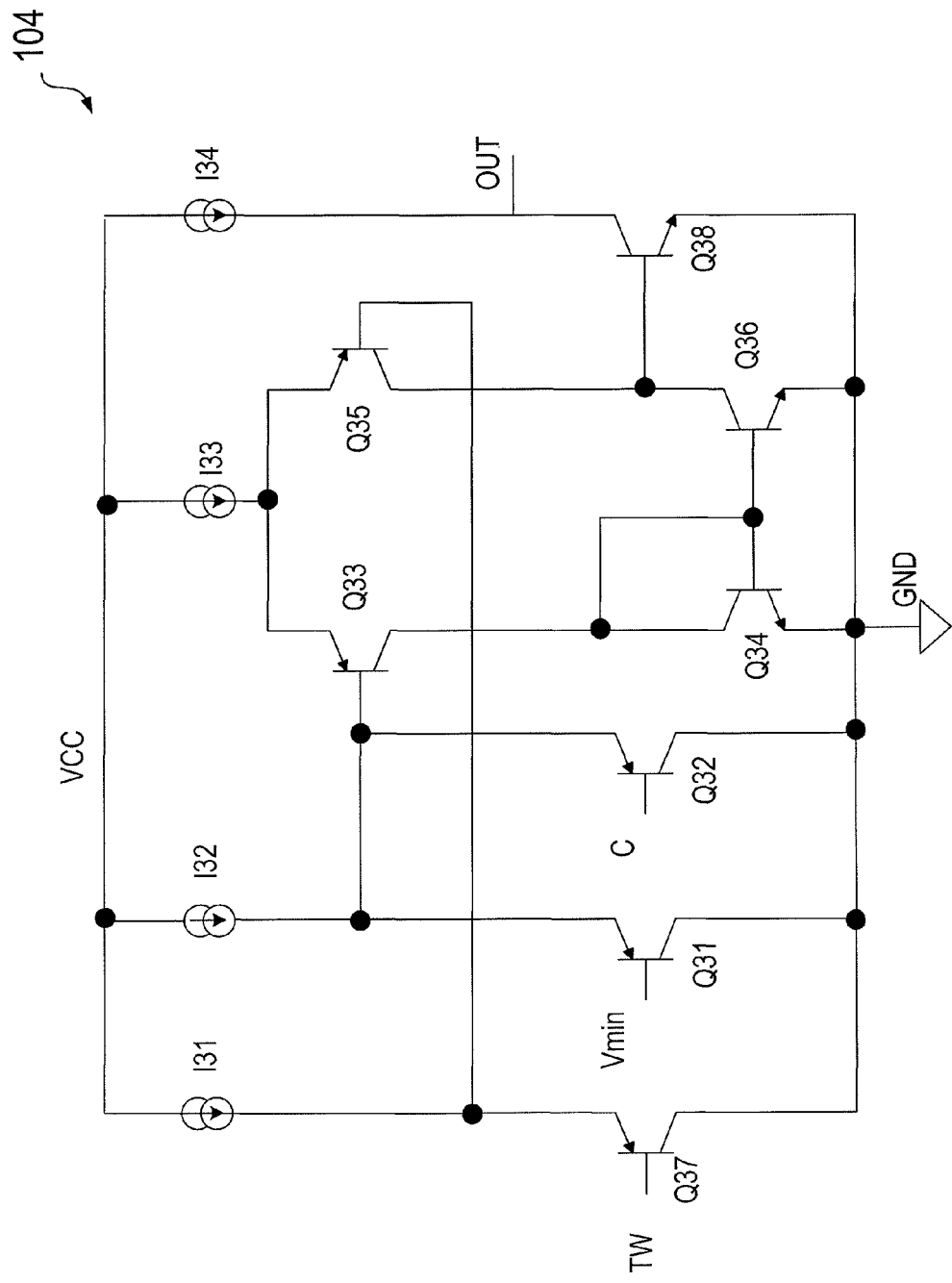
FIG. 5 is a simplified circuit diagram of a representative implementation of the comparator circuit in FIG. 1 according to an embodiment of the present invention.

FIG. 5 is a simplified circuit diagram of a representative implementation of comparator circuit 104 in FIG. 1 according to an embodiment of the present invention. As shown in FIGS. 1 and 5, comparator circuit 104 has three input terminals for receiving input signals C, Vmin, and TW. Input signals Vmin and C are coupled to input transistors Q31 and Q32, respectively, and input signal TW is coupled to a third input transistor Q37. Input transistors Q31, Q32, and Q37 are coupled to differential pair transistors Q33 and Q35, respectively. As shown in FIG. 5, in the differential pair, transistor Q33 is controlled by the lower of Vmin and C, and transistor Q35 is controlled by TW.

As shown in FIG. 5, comparator circuit 104 includes four current sources I31, I32, I33, and I34. Current source I31 is coupled to the emitters of transistors Q31 and Q32 and the base of transistor Q33. Current source I32 is coupled to the emitters of transistors Q31 and Q32. Current source I33 is coupled to the emitters of transistors Q33 and Q35. Current mirror transistors Q34 and Q36 provide currents to the differential pair. The output of the differential pair is coupled to an output stage which includes current source I34 and transistor Q38. An output terminal at the collector of transistor Q8 provides the output signal OUT of comparator circuit 104. In this configuration, input signal TW is compared to the lower one of input signals C and Vmin.

Figure 6:
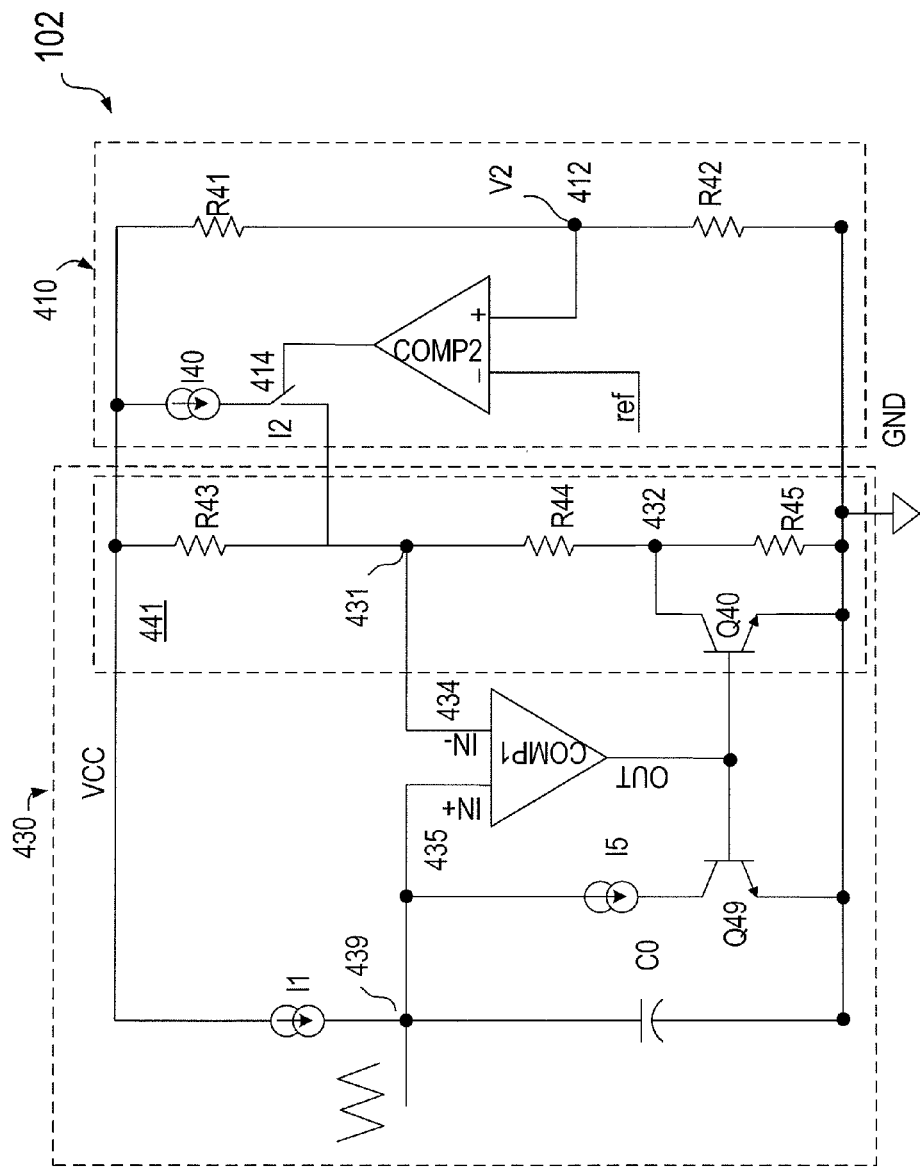
FIG. 6 is a simplified circuit diagram of a representative implementation of the triangle wave generation circuit in FIG. 1 according to an embodiment of the present invention.

FIG. 6 is a simplified circuit diagram of a representative implementation of triangle wave generation circuit 102 according to an embodiment of the present invention. This implementation is also configured to provide a triangle wave signal that can be adjusted according to a change in the supply voltage according to an embodiment of the present invention. In the embodiment of FIG. 6, the triangle wave signal is adjusted when the supply voltage drops below a certain level. Triangle wave generation circuit 400 includes block 410 and block 430. Block 410 is a supply voltage detector and controller, which is configured to generate a bias current I2 when a comparator COMP2 detects that supply voltage VCC is less than a predetermined voltage. In block 410, supply voltage VCC is sensed by voltage V2 at node 412 between resistors R41 and R42, which are connected in series between supply voltage VCC and ground GND. Accordingly, voltage V2 is linearly correlated to supply voltage VCC and is given by:

$$V2 = VCC*\frac{R42}{(R41 + R42)} \quad (2)$$

Comparator circuit COMP2 in block 410 compares voltage V2 with a reference voltage $V_{REF}$, which is selected as a low voltage reference. Moreover, a current source 140 is coupled to a switch 414, which is controlled by comparator COMP2. Switch 414 is turned on and current I2 starts to flow, when comparator COMP2 detects that V2 is lower than a $V_{REF}$, i.e., supply voltage VCC has dropped below a predetermined level. Similarly, I2 is turned off when V2 is higher than $V_{REF}$. As described below, current I2 is used for adjusting the minimum duty cycle of the PWM control signals, when a low VCC condition is detected.

In a specific embodiment, PWM controller 120 of FIG. 1 is designed to operate with a power supply of 12V, and it is desirable to trigger the low-voltage duty cycle change when VCC drops to, e.g., about 5V. For this application, resistors R41=4K and R42=1K may be used. In this case, the sensed supply voltage V2=1.0V according to equation (2)

$$V2 = 5V * \frac{1K}{(4K + 1K)},$$

when VCC drops to 5.0V and V2=1.0V. In other words, if $V_{REF}$ is set at a voltage above 1.0V, for example, 1.2V, then a sensed voltage V2 at 1.0V will trigger current I2. Of course, there can be many variations and modifications depending on the application.

In FIG. 6, block 430 includes a comparator COMP1, transistors Q40 and Q49, a capacitor C0, and current sources I1 and I5. In addition, resistors R3, R4, and R5 are connected in series between supply voltage VCC and ground terminal GND, with node 431 between R43 and R44, and node 432 between R44 and R45. An output OUT of comparator COMP1 is connected to the base terminals of transistors Q40 and Q49. The collector of Q40 is connected to node 432 between R44 and R45. Switch transistor Q40 and resistors R43, R44, and R45 form a variable reference voltage source 441, which provides reference input voltages to comparator COMP1 through node 431, which is connected to negative terminal 434 (IN−) of comparator COMP1. The collector of Q49 is connected to current source I5. A positive terminal 435 (IN+) of comparator COMP1 is connected to capacitor C at node 439, which provides a triangle wave output signal.

In an embodiment, the triangle wave signal is generated through charging and discharging of capacitor C0. The charging current is provided by current source I1, and the discharging current is provided by current source I5 flowing into transistor Q49.

In the charging phase, the voltage at node 439 of capacitor C0 is low. The positive input terminal 435 (IN+) of comparator COMP1, which is connected to node 439, is lower than the negative input terminal 434 (IN−) of comparator COMP1, causing comparator output OUT to be low, e.g., at or near the potential at GND. As a result, both transistors Q40 and Q49 are off. Under this condition, current I1 charges capacitor C0. Additionally, the voltage at negative input terminal 434 (IN−) of comparator COMP1, which is connected to node 431 between R3 and R4, provides the upper limit voltage VH of the triangle wave and can be expressed as follows:

$$VH = VCC\frac{(R44 + R45)}{(R43 + R44 + R45)} \quad (3)$$

The charging of capacitor C0 continues until the voltage at node 439 and at node 435(IN+) of comparator COMP1 becomes higher than VH at node 434 (IN−) of COMP1. At this point, output signal OUT of comparator COMP1 becomes high (e.g., at or near VCC), both transistors Q40 and Q49 are turned on, and the discharging phase begins, with capacitor C0 discharged with current I5. Moreover, because transistor Q40 is on, node 432 is pulled low to be near GND. The voltage at node 431 and negative input 434 (IN−) of COMP1 is now the lower limit voltage VL of the triangle wave and can be expressed as follows:

$$VL = VCC * \frac{R43}{(R43 + R44)} \quad (4)$$

The discharging of capacitor C0 continued until the voltage at node 439 becomes lower than VL, at which point the output of comparator COMP1 becomes low, and the charging phase is started again.

As a result of repeated charging and discharging of capacitor C0 as described above, a triangle wave form is generated at node 439. The amplitude of the triangle wave form varies between VH and VL as described in equations (3) and (4) above. It is also noted that both VH and VL depend on VCC. As a result, for a constant reference signal, the duty cycle is smaller at lower VCC. Consequently, when VCC is low, the duty cycle is lower, which may lead to an insufficient output.

As described above, when supply voltage VCC is low, i.e., when V2 is lower than predetermined reference voltage $V_{REF}$, current I2 generated in current source 140 flows through the resistors R44 and R45, raising the voltage at node 431. As a result, the upper and the lower levels of the triangle wave are now given, respectively, by:

$$VH = I2 * (R44 + R45) + VCC * \frac{(R44 + R45)}{(R43 + R44 + R45)} \quad (5)$$

and $$VL = I2 * R44 + VCC * \frac{R44}{(R43 + R44)} \quad (6)$$

As described above in connection with FIG. 1, the triangle wave output signal 116 of triangle wave generator 102 is coupled to comparator circuit 104, along with analog control signal 112, (C), and minimum duty cycle reference voltage 113, Vmin, to provide PWM output control signal 118. When the voltage at terminal C is higher than the voltage at terminal Vmin, the duty cycle of output pulse is determined by comparing the voltage at terminal Vmin to the triangle wave. The duty cycle output at this time is the minimum duty cycle. With the voltage at terminal Vmin denoted as Vmin, the minimum duty cycle Dmin is given by the following equations, with reference to FIG. 6.

When the supply voltage VCC is relatively high, i.e., V2>$V_{REF}$, I2 is not activated, and the minimum duty cycle is given by:

$$Dmin = \frac{VH - Vmin}{VH - VL} = \frac{\frac{(R44 + R45)}{(R43 + R44 + R45)} - \frac{R1}{(R0 + R1)}}{\frac{(R44 + R45)}{(R43 + R44 + R45)} - \frac{R44}{(R44 + R45)}} \quad (7)$$

where the minimum duty cycle setting voltage Vmin is given by R0 and R1 in FIG. 1:

$$Vmin = VCC * \left(\frac{R1}{R0 + R1}\right) \quad (8)$$

When supply voltage VCC is low, i.e., $V2<V_{REF}$, I2 is activated. As a result, VH and VL are raised, and the minimum duty cycle Dmin is given by the following equation:

$$D\min = \frac{VH - V\min}{VH - VL} \qquad (9)$$

$$= \frac{I2*(R44+R45) + VCC*\frac{(R44+R45)}{(R43+R44+R45)} - VCC*\frac{R1}{(R0+R1)}}{I2*(R44+R45) + VCC*\frac{(R44+R45)}{(R43+R44+R45)} - \left(I2*R4 + VCC*\frac{R44}{(R43+R44)}\right)}$$

which can be expressed as follows:

$$D\min = \frac{VH - V\min}{VH - VL} \qquad (10)$$

$$= \frac{\frac{I2*(R44+R45)}{VCC} + \frac{(R44+R45)}{(R6+R7+R8)} - \frac{R1}{(R0+R1)}}{\frac{I2*R45}{VCC} + \frac{(R44+R45)}{(R43+R44+R45)} - \frac{R44}{(R43+R44)}}$$

The above equations show that when the supply voltage is lower than a predetermined reference voltage, contribution from I2 raises the triangle wave form which, in turn, increases the minimum duty cycle. Additionally, the change in the triangle wave form also impacts the duty cycle D of the PWM signal, even when Dmin is not activated. Specifically, in the embodiment of FIGS. 1, 3, and 4, the duty cycle D of the PWM signal is determined by a comparison of input signal Vin and the triangle wave, and can be expressed as follows:

When the supply voltage is relatively high, i.e., $V2>V_{REF}$, I2 is not activated, and duty cycle D is given by:

$$D = \frac{VH - Vin}{VH - VL} \qquad (11)$$

$$= \frac{VCC*\frac{(R44+R45)}{(R43+R44+R45)} - Vin}{VCC*\frac{(R44+R45)}{(R43+R44+R45)} - VCC*\frac{R44}{(R43+R44)}}$$

which can be expressed as follows:

$$D = \frac{VH - Vin}{VH - VL} = \frac{\frac{(R44+R45)}{(R43+R44+R45)} - \frac{Vin}{VCC}}{\frac{(R44+R45)}{(R43+R44+R45)} - \frac{R44}{(R43+R44)}} \qquad (12)$$

When supply voltage VCC is low, i.e., $V2<V_{REF}$, I2 is activated, and duty cycle D is given by the following equation:

$$D = \frac{VH - Vin}{VH - VL} = \frac{I2*(R44+R45) + VCC*\frac{(R44+R45)}{(R43+R44+R45)} - Vin}{I2*(R44+R45) + VCC*\frac{(R44+R45)}{(R43+R44+R45)} - \left(I2*R44 + VCC*\frac{R44}{(R43+R44)}\right)} \qquad (13)$$

which can be expressed as follows:

$$D = \frac{VH - Vin}{VH - VL} = \frac{\frac{I2*(R44+R45)}{VCC} + \frac{(R44+R45)}{(R43+R44+R45)} - \frac{Vin}{VCC}}{\frac{I2*R45}{VCC} + \frac{(R44+R45)}{(R43+R44+R45)} - \frac{R44}{(R43+R44)}} \qquad (14)$$

Thus the duty cycle, D, is also increased from the contribution from I2.

Note Vin in the above expressions represents analog input control signal C at terminal 112 to PWM comparator 104. As describe above in connection with FIGS. 1 and 2, this analog signal is related to the input pulsed signal 110, which has a duty cycle of t, by equation (1) reproduced below.

$$VOUT = VC20 = (1-t)*VCC*\left(\frac{R26}{R23}\right) \qquad (1)$$

When this expression for Vin can be substituted in the above equation for duty cycle, D, it can be seen that duty cycle D of the output control signal is linearly related to the duty cycle of the input pulsed signal t.

$$D = \frac{VH - Vin}{VH - VL} = \frac{\frac{(R44+R45)}{(R43+R44+R45)} - (1-t)*\left(\frac{R26}{R23}\right)}{\frac{(R44+R45)}{(R43+R44+R45)} - \frac{R44}{(R43+R44)}} \qquad (15)$$

In other words, D is large when t is large, and D is small when t is small. It can be seen from Eq. 15 that the slope or proportionality coefficient between the output duty cycle D and the input duty cycle t is ((R26/R23)/((R44+R45)/(R43+R44+R45))−(R44/(R43+R44)))h. Eq. 15 also shows that increasing R26 can increase the slope between the output pulse and input pulse. Similarly, increasing R23 can decrease the slope between the output pulse and input pulse.

Although the above has been shown using a selected group of components for the PWM control circuit, the motor control circuit, and the motor system, respectively, there can be many alternatives, modifications, and variations. For example, some of the components may be expanded and/or combined. Other components may be inserted to those noted above. Depending upon the embodiment, the arrangement of components may be interchanged with others replaced. In some embodiments, the components in the PWM control circuit described above can be implemented in a single integrated circuit chip. Similarly, the motor control circuit described above can be implemented in a single integrated circuit chip. Alternatively, some of the components of the PWM controller or the motor controller can be implemented using discrete components, while others can be implemented in an integrated circuit chip. In an alternative embodiment, the triangle wave signal can be adjusted in response to other circuit or operation conditions to change the duty cycle of the PWM control signal.

While certain embodiments of the invention have been illustrated and described, those skilled in the art with access to the present teachings will recognize that the invention is not limited to these embodiments only. Numerous modifications, changes, variations, substitutions, and equivalents will be apparent to those skilled in the art.

What is claimed is:

1. A pulse width modulated (PWM) controller, comprising:
    an input terminal for receiving a pulsed input signal having a first duty cycle;
    a power supply terminal for receiving a power supply voltage;
    a minimum duty cycle reference voltage signal generation circuit for providing a minimum duty cycle reference voltage signal; and
    a control circuit for providing a pulse-width-modulated (PWM) output signal having a second duty cycle linearly related to the first duty cycle of the pulsed input signal, the PWM output signal having a minimum duty cycle that is adjustable in response to a change in the power supply voltage.

2. The PWM control circuit of claim 1, wherein the second duty cycle and the first duty cycle are correlated in a substantially linear relationship with an adjustable slope.

3. The PWM control circuit of claim 1, further comprising:
    a signal conversion circuit for converting the pulsed input signal to an analog signal having a magnitude inversely correlated to the first duty cycle of the pulsed input signal;
    a triangle wave generation circuit for generating a triangle wave signal configured to oscillate between an upper limit voltage and a lower limit voltage, the upper limit voltage and the lower limit voltage being adjustable in response to a change in the power supply voltage; and
    a pulse generation circuit coupled to the signal conversion circuit, the triangle wave generation circuit, and the minimum duty cycle reference voltage signal, the pulse generation circuit being configured to generate a PWM pulse signal having a minimum duty cycle related to the triangle wave signal and the minimum duty cycle reference voltage signal.

4. The PWM control circuit of claim 3, wherein the upper limit voltage and the lower limit voltage of the triangle wave signal are raised when the power supply voltage is lower than a predetermined supply reference voltage.

5. The PWM control circuit of claim 3, wherein the PWM output signal is characterized by a first minimum duty cycle when the power supply voltage is above a supply reference voltage, and by a second minimum duty cycle when the power supply voltage is below the supply reference voltage, the second minimum duty cycle being higher than the first minimum duty cycle.

6. The PWM control circuit of claim 3, wherein the signal conversion circuit comprises:
    first, second, and third pairs of serially-connected resistors, each pair of resistors being coupled between the power supply terminal and a ground terminal, the first pair including first and second resistors, the second pair including third and fourth resistors, and the third pair including fifth and sixth resistors;
    an input terminal coupled to the first pair of resistors;
    a first transistor coupled between the first and the second pairs of resistors;
    a second transistor coupled between the second and the third pair of resistors;
    a capacitor coupled to the third pair of resistors; and
    an output terminal coupled to the capacitor.

7. The PWM control circuit of claim 6, wherein the fourth resistor is substantially larger than the third resistor, and the fifth resistor is substantially larger than the sixth resistor.

8. The PWM control circuit of claim 6, wherein an output signal at the output terminal of the signal conversion circuit is inversely related to a duty cycle of an input signal at the input terminal.

9. The PWM control circuit of claim 3, wherein the triangle wave generation circuit comprises:
    a capacitor having an output terminal for providing the triangle wave signal;
    a first current source coupled to the capacitor for charging the capacitor;
    a second current source coupled to the capacitor for discharging the capacitor;
    a variable reference voltage source configured to provide the upper limit voltage when the capacitor is being charged and the lower limit voltage when the capacitor is being discharged, the variable reference voltage source being further configured to receive a bias current for raising the upper limit voltage and the lower limit voltage when the power supply voltage is lower than a supply reference voltage; and
    a first comparator having a first input coupled to the capacitor and a second input coupled to the variable reference voltage source.

10. The PWM control circuit of claim 9, wherein the variable reference voltage source comprises:
    a voltage divider having first resistor, second resistor, and third resistor connected in series between the power supply terminal and a ground terminal;
    a first node between the first and the second resistors adapted for providing the upper limit voltage and the lower limit voltage of the triangle wave signal, the first node being also adapted for receiving the bias current that is configured to raise the upper limit voltage and the lower limit voltage; and
    a second switch transistor coupled to the first comparator and to a second node between the second and the third resistors, the second switch transistor being configured to couple the second node to the ground terminal in response to the output of the comparator.

11. A motor control circuit, comprising:
    a signal conversion circuit for converting a pulsed input signal having a first duty cycle to an analog signal having a magnitude inversely correlated to the first duty cycle of the pulsed input signal;
    a triangle wave generation circuit for generating a triangle wave signal configured to oscillate between an upper limit voltage and a lower limit voltage, the upper limit voltage and the lower limit voltage being adjustable in response to a change in a power supply voltage;
    a pulse generation circuit coupled to the signal conversion circuit, the triangle wave generation circuit, and a minimum duty cycle reference voltage signal, the pulse generation circuit being configured to provide a PWM pulse signal having a second duty cycle correlated to the first duty cycle of the pulsed input signal, the PWM pulse signal having a minimum duty cycle related to the triangle wave signal and the minimum duty cycle reference voltage signal;
    a Hall signal processing circuit;
    a logic circuit coupled to the pulse generation circuit and the Hall signal processing unit, the logic circuit being configured to provide motor control signals; and a the bridge driver circuit coupled to the logic circuit for receiving the motor control signals and configured to control a speed of a motor.

12. The circuit of claim 11, wherein the upper limit voltage and the lower limit voltage of the triangle wave signal are raised when the power supply voltage is lower than a predetermined supply reference voltage.

13. The circuit of claim 11, wherein the PWM pulse signal is characterized by a first minimum duty cycle when the power supply voltage is above a supply reference voltage, and by a second minimum duty cycle when the power supply voltage is below the supply reference voltage, the second minimum duty cycle being higher than the first duty cycle.

14. The circuit of claim 11, wherein the triangle wave generation circuit comprises:
a capacitor having an output terminal for providing the triangle wave signal;
a first current source coupled to the capacitor for charging the capacitor;
a second current source coupled to the capacitor for discharging the capacitor;
a variable reference voltage source configured to provide the upper limit voltage when the capacitor is being charged and the lower limit voltage when the capacitor is being discharged, the variable reference voltage source being further configured to receive a bias current for raising the upper limit voltage and the lower limit voltage when the power supply voltage is lower than a supply reference voltage; and
a first comparator having a first input coupled to the capacitor and a second input coupled to the variable reference voltage source.

15. The circuit of claim 11, wherein the signal conversion circuit comprises:
first, second, and third pairs of resistors, each pair coupled between a power supply terminal and a ground terminal, the first pair including first and second resistors in series, the second pair including third and fourth resistors in series, and the third pair including fifth and sixth resistors in series, wherein the fourth resistor is substantially larger than the third resistor, and the fifth resistor is substantially larger than the sixth resistor;
an input terminal coupled to the first pair of resistors;
a first transistor coupled between the first and the second pairs of resistors;
a second transistor coupled between the second and the third pair of resistors;
a capacitor coupled to the third pair of resistors; and
an output terminal coupled to the capacitor.

16. The circuit of claim 15, wherein an output signal at the output terminal of the signal conversion circuit is inversely correlated to a duty cycle of an input signal at the input terminal.

17. The circuit of claim 11 wherein the Hall signal processing circuit produces a signal for controlling the current in the coil in the motor when a rotor passes through a cross-point between the north pole and south pole in the motor.

18. The circuit of claim 11 wherein the logic circuit is configured to select current paths in the bridge driver circuit and to control a direction of the current through a coil in response to control signals from the Hall signal processing circuit, wherein the logic circuit is also configured to control a magnitude of the current in the coil in response to the PWM pulse signal from the pulse generation circuit.

19. The circuit of claim 11 wherein the motor control circuit is implemented in a single integrated circuit chip.

20. A motor system, comprising:
a motor; and
a motor control circuit, including:
a signal conversion circuit for converting a pulsed input signal having a first duty cycle to an analog signal having a magnitude inversely correlated to the first duty cycle of the pulsed input signal;
a triangle wave generation circuit for generating a triangle wave signal configured to oscillate between an upper limit voltage and a lower limit voltage, the upper limit voltage and the lower limit voltage being adjustable in response to a change in a power supply voltage;
a pulse generation circuit coupled to the signal conversion circuit, the triangle wave generation circuit, and a minimum duty cycle reference voltage signal, the pulse generation circuit being configured to provide a PWM control signal having a second duty cycle linearly correlated to the first duty cycle of the pulsed input signal, the PWM control signal having a minimum duty cycle related to the triangle wave signal and the minimum duty cycle reference voltage signal;
a Hall signal processing circuit for detecting a direction in a current flow in a coil of the motor;
a logic circuit coupled to the pulse generation circuit and the Hall signal processing unit, the logic circuit being configured to provide motor control signals; and
a bridge driver circuit coupled to the logic circuit for receiving the motor control signals and configured to control a speed of the motor in response to the PWM control signal.

21. The motor of claim 20 wherein the signal conversion circuit comprises:
first, second, and third pairs of resistors, each pair coupled between a power supply terminal and a ground terminal, the first pair including first and second resistors in series, the second pair including third and fourth resistors in series, and the third pair including fifth and sixth resistors in series, wherein the fourth resistor is substantially larger than the third resistor, and the fifth resistor is substantially larger than the sixth resistor;
an input terminal coupled to the first pair of resistors;
a first transistor coupled between the first and the second pairs of resistor;
a second transistor coupled between the second and the third pair of resistors;
a capacitor coupled to the third pair of resistors; and
an output terminal coupled to the capacitor.

22. The motor of claim 21 wherein an output signal at the output terminal of the signal conversion circuit is inversely correlated to a duty cycle of an input signal at the input terminal.

23. The motor of claim 20 wherein the upper limit voltage and the lower limit voltage of the triangle wave signal are raised when the power supply voltage is lower than a predetermined reference voltage.

24. The motor of claim 20 wherein the triangle wave generation circuit comprises:
a capacitor having an output terminal for providing the triangle wave signal;
a first current source coupled to the capacitor for charging the capacitor;
a second current source coupled to the capacitor for discharging the capacitor;
a variable reference voltage source configured to provide the upper limit voltage when the capacitor is being charged and the lower limit voltage when the capacitor is being discharged, the variable reference voltage source being further configured to receive a bias current for raising the upper limit voltage and the lower limit voltage when the power supply voltage is lower than a supply reference voltage; and a first comparator having a first input coupled to the capacitor and a second input coupled to the variable reference voltage source.

* * * * *